United States Patent [19]

Kawase

[11] Patent Number: 6,078,724

[45] Date of Patent: Jun. 20, 2000

[54] MAGNETIC REPRODUCING APPARATUS OF HELICAL SCAN TYPE

[75] Inventor: Shigeru Kawase, Yokohama, Japan

[73] Assignee: Victor Company of Japan, Ltd., Yokohama, Japan

[21] Appl. No.: 08/910,219

[22] Filed: Aug. 13, 1997

[30] Foreign Application Priority Data

Aug. 29, 1996 [JP] Japan .................................... 8-247119

[51] Int. Cl.[7] .................................................. H04N 5/91
[52] U.S. Cl. ................................ 386/71; 386/74; 386/81
[58] Field of Search .............................. 386/6–8, 68, 74, 386/81, 71; 360/2, 26, 51, 61, 64; H04N 5/91

[56] References Cited

U.S. PATENT DOCUMENTS

| | | | |
|---|---|---|---|
| 4,257,073 | 3/1981 | Tatami | 386/71 |
| 4,725,898 | 2/1988 | Tokuyama | 386/71 |
| 4,851,930 | 7/1989 | Fukuda et al. | 386/74 |
| 5,121,264 | 6/1992 | Ii | 386/74 |
| 5,179,477 | 1/1993 | Kodama | 386/71 |
| 5,184,254 | 2/1993 | Kaneko et al. | 386/74 |
| 5,301,070 | 4/1994 | Tanaka | 386/74 |
| 5,504,642 | 4/1996 | Kinjo et al. . | |

*Primary Examiner*—Thai Tran
*Assistant Examiner*—Vincent F. Boccio

*Attorney, Agent, or Firm*—Pollock, Vande Sande & Amernick

[57] ABSTRACT

A magnetic reproducing apparatus of a helical scan type includes a rotary drum on which a magnetic tape is wound along a part of a helix. A first set of a main head and a sub head is mounted on the rotary drum. The main head and the sub head in the first set are positionally close to each other. The main head and the sub head in the first set have a first azimuth angle and a second azimuth angle respectively. A second set of a main head and a sub head is mounted on the rotary drum. The main head and the sub head in the second set are positionally close to each other. The main head and the sub head in the second set have the second azimuth angle and the first azimuth angle respectively. The second set is opposed to the first set. During a special playback process different from a standard playback process, the magnetic tape is continuously fed while one is sequentially selected from among output signals of the main head and the sub head in the first set and output signals of the main head and the sub head in the second set at a period corresponding to a field to generate a first reproduced signal. The first reproduced signal is periodically and selectively delayed and undelayed to minimize differences among timing positions of vertical sync signals in the first reproduced signal. Thereby, the first reproduced signal is converted to a second reproduced signal. Vertical sync signals in the second reproduced signal are replaced by pseudo vertical sync signals.

6 Claims, 11 Drawing Sheets

(a) FIRST COMPOSITE VIDEO SIGNAL
(b) PSEUDO V-SYNC
(c) SECOND COMPOSITE VIDEO SIGNAL
(d) OUTPUT OF FLIP-FLOP 31
(e) OUTPUT OF DELAY CIRCUIT 26

MAGNETIC REPRODUCING APPARATUS OF HELICAL SCAN TYPE

BACKGROUND OF THE INVENTION

1. Field of the Invention

This invention generally relates to a magnetic reproducing apparatus. This invention particularly relates to a VTR (video tape recorder) of a helical scan type which can implement variable speed playback.

2. Description of the Related Art

In some home-use VTR's (video tape recorders), slow-motion playback is implemented by intermittently feeding a magnetic tape. The upper limit of the speed of the intermittent feed of the magnetic tape is determined by factors such as the moment of inertia of the capstan motor and the response characteristic of the tape feeding mechanism. Accordingly, the speed of the slow-motion playback is generally limited to within a range equal to or lower than about one-fourth of the standard playback speed (the normal playback speed). It tends to be difficult to provide a slow-motion playback speed equal to one-third of the standard playback speed or a half of the standard playback speed.

Generally, business-use VTR's are able to implement special playback in addition to standard playback (normal playback). An example of the special playback is slow-motion playback.

There is a business-use VTR having a rotary drum containing an actuator using a bimorph cell. The actuator serves to control the heights of heads supported on the rotary drum. During the special playback mode of operation of the business-use VTR, a magnetic tape remains fed continuously in synchronism with rotation of the rotary drum while the heights of the heads are controlled by the actuator to generate a reproduced signal with a constant level.

SUMMARY OF THE INVENTION

It is an object of this invention to provide an improved magnetic reproducing apparatus of a helical scan type.

A first aspect of this invention provides a magnetic reproducing apparatus of a helical scan type, comprising a rotary drum on which a magnetic tape is wound along a part of a helix; a first set of a main head and a sub head mounted on the rotary drum, the main head and the sub head in the first set being positionally close to each other, the main head and the sub head in the first set having a first azimuth angle and a second azimuth angle respectively; a second set of a main head and a sub head mounted on the rotary drum, the main head and the sub head in the second set being positionally close to each other, the main head and the sub head in the second set having the second azimuth angle and the first azimuth angle respectively, the second set being opposed to the first set; means for continuously feeding the magnetic tape and sequentially selecting one from among output signals of the main head and the sub head in the first set and output signals of the main head and the sub head in the second set at a period corresponding to a field to generate a first reproduced signal and to implement a special playback process different from a standard playback process; means for periodically and selectively delaying and undelaying the first reproduced signal to minimize differences among timing positions of vertical sync signals in the first reproduced signal, and thereby converting the first reproduced signal to a second reproduced signal; means for generating pseudo vertical sync signals; and means for replacing vertical sync signals in the second reproduced signal by the pseudo vertical sync signals.

A second aspect of this invention is based on the first aspect thereof, and provides a magnetic reproducing apparatus wherein the main heads in the first and second sets comprise heads for the standard playback process, and the sub heads in the first and second sets comprise heads for an extended playback process which relates to a track pitch equal to one-third of a track pitch in the standard playback process.

A third aspect of this invention is based on the first aspect thereof, and provides a magnetic reproducing apparatus wherein the replacing means comprises means for advancing the pseudo vertical sync signals by at least one 1-field time interval, and means for replacing the vertical sync signals in the second reproduced signal by the advancing-resultant pseudo vertical sync signals.

A fourth aspect of this invention is based on the first aspect thereof, and provides a magnetic reproducing apparatus wherein the delaying/undelaying means comprises means for periodically and selectively delaying and undelaying luminance components of the first reproduced signal, and means for continuing to undelay color components of the first reproduced signal.

A fifth aspect of this invention is based on the first aspect thereof, and provides a magnetic reproducing apparatus further comprising means for varying a slant angle of the main heads and the sub heads in the first and second sets with respect to the magnetic tape, and means for, during the special playback process, controlling the varying means to hold a level of the first reproduced signal substantially constant for every 1-field time interval.

A sixth aspect of this invention provides a magnetic reproducing apparatus of a helical scan type, comprising a rotary drum on which a magnetic tape is wound along a part of a helix; a first set of a main head and a sub head mounted on the rotary drum, the main head and the sub head in the first set being positionally close to each other, the main head and the sub head in the first set having a first azimuth angle and a second azimuth angle respectively; a second set of a main head and a sub head mounted on the rotary drum, the main head and the sub head in the second set being positionally close to each other, the main head and the sub head in the second set having the second azimuth angle and the first azimuth angle respectively, the second set being opposed to the first set; means for continuously feeding the magnetic tape and sequentially selecting one from among output signals of the main head and the sub head in the first set and output signals of the main head and the sub head in the second set at a period corresponding to a field to generate a first reproduced signal and to implement a special playback process having a playback speed equal to a non-integer times a standard playback speed; means for periodically and selectively delaying and undelaying the first reproduced signal to minimize differences among timing positions of vertical sync signals in the first reproduced signal, and thereby converting the first reproduced signal to a second reproduced signal; means for generating pseudo vertical sync signals; means for periodically replacing the second reproduced signal by the pseudo vertical sync signals at replacement timing positions; and means for deciding the replacement timing positions on the basis of a reference replacement timing position at which a vertical shake of images, reproduced at a playback speed selected from among playback speeds including a still-image playback speed, is minimized.

DESCRIPTION OF THE PREFERRED EMBODIMENT

First Embodiment

Figure 1:
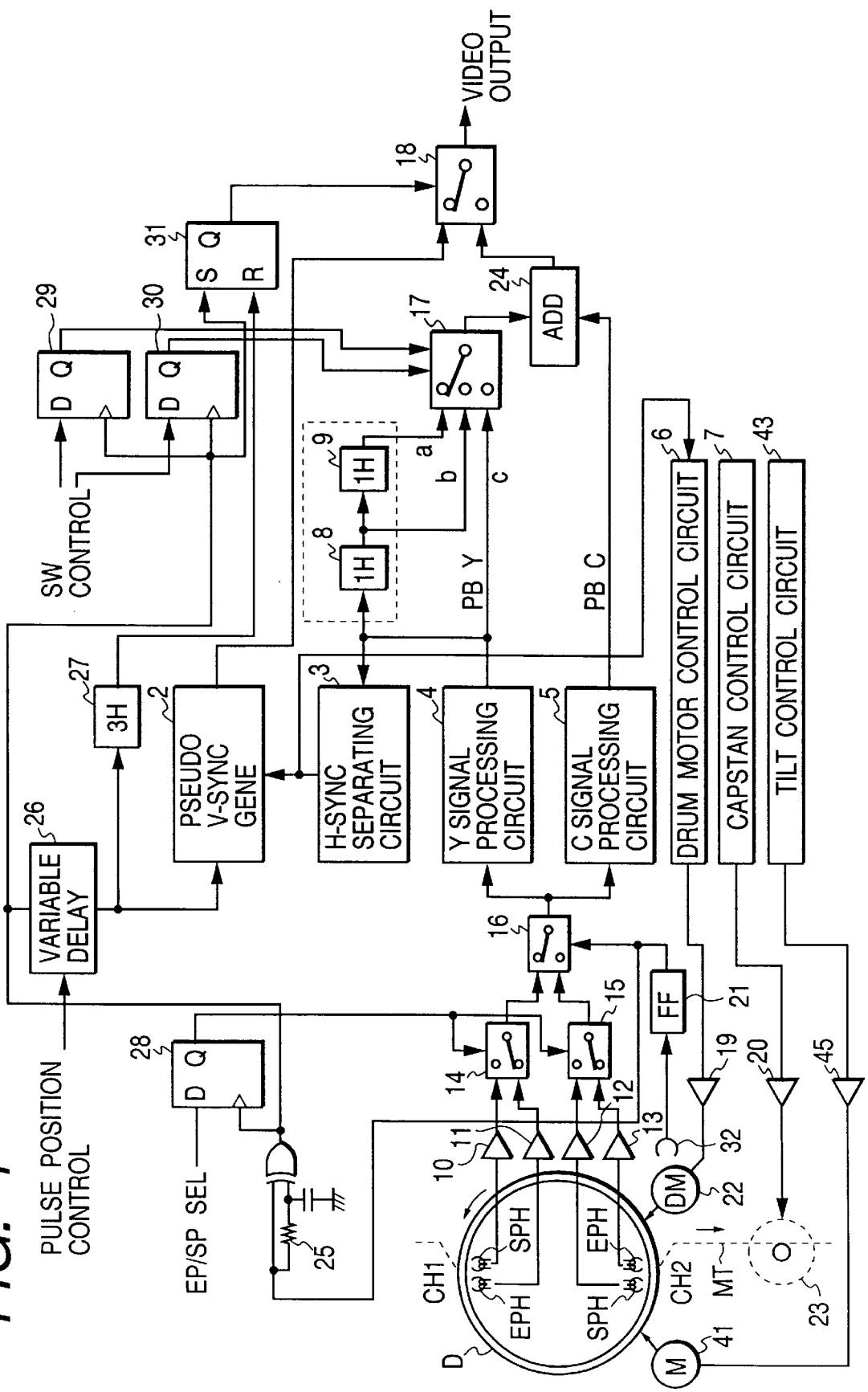
FIG. 1 is a diagram of a magnetic reproducing apparatus according to a first embodiment of this invention.

With reference to FIG. 1, a magnetic reproducing apparatus of a helical scan type includes a rotary drum D on which video heads are mounted. The video heads include an SP head (a main head) SPH and an EP head (a sub head) EPH for a channel CH1, and an SP head (a main head) SPH and an EP head (a sub head) EPH for a channel CH2. The SP heads for the channels CH1 and CH2 are designed for standard playback. The EP heads for the channels CH1 and CH2 are designed for extended playback.

The positions of the main head SPH and the sub head EPH for the channel CH1 are close to each other. Regarding the channel CH1, the sub head EPH precedes the main head SPH by an angle corresponding to twice a horizontal scanning period (that is, corresponding to a 2H interval). The main head SPH and the sub head EPH for the channel CH1 have different azimuth angles, respectively. The positions of the main head SPH and the sub head EPH for the channel CH2 are close to each other. Regarding the channel CH2, the sub head EPH precedes the main head SPH by an angle corresponding to twice a horizontal scanning period (that is, corresponding to a 2H interval). The main head SPH and the sub head EPH for the channel CH2 have different azimuth angles, respectively. The main head SPH for the channel CH1 and the main head SPH for the channel CH2 are opposed diametrically with respect to the rotary drum D. The sub head EPH for the channel CH1 and the sub head EPH for the channel CH2 are opposed to each other diametrically with respect to the rotary drum D. The azimuth angle of the main head SPH for the channel CH1 is equal to the azimuth angle of the sub head EPH for the channel CH2. The azimuth angle of the main head SPH for the channel CH2 is equal to the azimuth angle of the sub head EPH for the channel CH1. The positional difference between the main head SPH for the channel CH1 and the sub head EPH for the channel CH2 corresponds to twice a horizontal scanning period (that is, corresponding to a 2H interval). Similarly, the positional difference between the main head SPH for the channel CH2 and the sub head EPH for the channel CH1 corresponds to twice a horizontal scanning period (that is, corresponding to a 2H interval).

A magnetic tape MT is wound on the rotary drum D along a part of a helix in an angular range of slightly greater than 180°. Regarding the main head SPH and the sub head EPH for the channel CH1, and the main head SPH and the sub head EPH for the channel CH2, the rotary drum D has a variable effective slant angle (a variable effective tilt angle) with respect to the magnetic tape MT. The effective slant angle between the rotary drum D and the magnetic tape MT can be varied by a suitable mechanism. In other words, the main head SPH and the sub head EPH for the channel CH1, and the main head SPH and the sub head EPH for the channel CH2 have a variable effective slant angle (a variable effective tilt angle) with respect to the magnetic tape MT. The effective slant angle between the heads and the magnetic tape MT can be varied by a suitable mechanism.

An output signal of the main head SPH for the channel CH1 is transmitted to a switch 14 via an amplifier 10. An output signal of the sub head EPH for the channel CH1 is transmitted to the switch 14 via an amplifier 11. The switch 14 periodically and cyclically selects one of the output signals of the main head SPH and the sub head EPH for the channel CH1 in response to an output signal of a flip-flop circuit 28. The switch 14 outputs the selected signal to a switch 16.

An output signal of the main head SPH for the channel CH2 is transmitted to a switch 15 via an amplifier 12. An output signal of the sub head EPH for the channel CH2 is transmitted to the switch 15 via an amplifier 13. The switch 15 periodically and cyclically selects one of the output signals of the main head SPH and the sub head EPH for the channel CH2 in response to the output signal of the flip-flop circuit 28. The switch 15 outputs the selected signal to the switch 16.

The switch 16 periodically and cyclically selects one of the output signals of the switches 14 and 15 in response to an output signal of a flip-flop circuit 21. The switch 16 outputs the selected signal to a luminance signal processing circuit 4 and a color signal processing circuit 5.

The luminance signal processing circuit 4 demodulates the output signal of the switch 16 into a luminance signal (a Y signal or a signal PB Y). The luminance signal processing circuit 4 outputs the luminance signal to a horizontal sync signal separating circuit 3, a delay circuit (a delay line) 8, and a switch 17.

The delay circuit 8 defers the output signal of the luminance signal processing circuit 4 by a time interval equal to a horizontal scanning period (a 1H interval). An output signal of the delay circuit 8 is applied to the switch 17 and a delay circuit (a delay line) 9. The delay circuit 9 defers the output signal of the delay circuit 8 by a time interval equal to a horizontal scanning period (a 1H interval). Accordingly, an output signal of the delay circuit 9 is deferred from the output signal of the luminance signal processing circuit 4 by a time interval equal to twice a horizontal scanning period (that is, equal to a 2H interval). The output signal of the delay circuit 9 is applied to the switch 17.

The switch 17 periodically and cyclically selects one from among the output signals of the luminance signal processing circuit 4 and the delay circuits 8 and 9 in response to output signals of flip-flop circuits 29 and 30. The switch 17 outputs the selected signal to an adding circuit 24.

The color signal processing circuit 5 demodulates (converts) the output signal of the switch 16 into a color signal (a C signal or a signal PB C). The color signal processing circuit 5 outputs the color signal to the adding circuit 24. The adding circuit 24 combines the output signals of the switch 17 and the color signal processing circuit 5 into a first composite video signal. The adding circuit 24 outputs the first composite video signal (the combination-resultant signal) to a switch 18.

The horizontal sync signal separating circuit 3 extracts a horizontal sync signal from the output signal of the luminance signal processing circuit 4. The horizontal sync signal separating circuit 3 outputs the horizontal sync signal to a pseudo vertical sync signal generating circuit 2 and a drum motor control circuit 6.

The pseudo vertical sync signal generating circuit 2 produces a pseudo vertical sync signal in response to the output signal of the horizontal sync signal separating circuit 3 and an output signal of a variable pulse delay circuit 26. The pseudo vertical sync signal generating circuit 2 outputs the pseudo vertical sync signal to the switch 18. The switch 18 selects one of the output signals of the pseudo vertical sync signal generating circuit 2 and the adding circuit 24 in response to an output signal of a flip-flop circuit 31, thereby combining the output signals of the pseudo vertical sync signal generating circuit 2 and the adding circuit 24 into a second composite video signal. The switch 18 outputs the second composite video signal.

The rotary drum D can be rotated by a drum motor 22. The drum motor control circuit 6 generates a control signal for the drum motor 22 in response to the output signal of the horizontal sync signal separating circuit 3. The drum motor control circuit 6 feeds the control signal to the drum motor 22 via an amplifier 19 so that the rotational speed of the rotary drum D will vary in accordance with a change in the speed of the feed of the magnetic tape MT. This control of the rotational speed of the rotary drum D is designed to hold constant the relative linear velocity between the magnetic tape MT and the video heads.

A pickup head 32 is associated with the drum motor 22. The pickup head 32 generates a rotation phase signal depending on rotation of the rotary drum D. The pickup head 32 outputs the rotation phase signal to the flip-flop circuit 21. The flip-flop circuit 21 serves as a delay circuit. The output signal (The drum pulse) of the flip-flop circuit 21 is fed to the switch 16. The output signal of the flip-flop circuit 21 is also fed to a monostable multivibrator (a one-shot multivibrator) 25 including a differentiating circuit.

The monostable multivibrator 25 outputs a pulse synchronized with each of rising edges and falling edges in the output signal of the flip-flop circuit 21. The monostable multivibrator 25 feeds the resultant pulse signal to the variable pulse delay circuit 26 and the flip-flop circuits 28, 29, 30, and 31.

The flip-flop circuit 28 receives an EP/SP selection control signal from a suitable circuit (not shown). The flip-flop circuit 28 latches the EP/SP selection control signal in response to the output signal of the monostable multivibrator 25. The flip-flop circuit 28 outputs the latching-resultant signal to the switches 14 and 15.

The variable pulse delay circuit 26 receives a pulse position control signal from a suitable circuit (not shown). The variable pulse delay circuit 26 defers the output signal of the monostable multivibrator 25 by a time interval depending on the pulse position control signal. An output signal of the variable pulse delay circuit 26 is fed to the pseudo vertical sync signal generating circuit 2 and a delay circuit 27. The delay circuit 27 defers the output signal of the variable pulse delay circuit 26 by a time interval equal to three times a horizontal scanning period (that is, equal to a 3H interval). An output signal of the delay circuit 27 is fed to the flip-flop circuit 31.

The flip-flop circuit 31 is periodically set in response to the output signal of the monostable multivibrator 25. The flip-flop circuit 31 is periodically reset in response to the output signal of the delay circuit 27. The output signal of the flip-flop circuit 31 is fed to the switch 18.

The flip-flop circuits 29 and 30 receive respective bits of a 2-bit switch control signal from a suitable circuit (not shown). The flip-flop circuits 29 and 30 latch the respective bits of the 2-bit switch control signal in response to the output signal of the monostable multivibrator 25. The flip-flop circuits 29 and 30 output the latching-resultant signals to the switch 17.

A capstan control circuit 7 generates a control signal for a capstan motor 23. The capstan control circuit 7 feeds the control signal to the capstan motor 23 via an amplifier 20 to control the speed of the feed of the magnetic tape MT. The capstan control circuit 7 responds to an operation mode signal, that is, a signal representing the present mode of operation of the magnetic reproducing apparatus. It should be noted that the operation mode signal is generated by a suitable circuit (not shown).

The rotary drum D is provided with a mechanism for changing the effective slant angle with respect to the magnetic tape MT regarding the video heads (the rotary heads). This mechanism includes a motor 41 for tilting and untilting a head-support member of the rotary drum D. A tilt control circuit 43 generates a control signal for the motor 41. The tilt control circuit 43 feeds the control signal to the motor 41 via an amplifier 45. The motor 41 tilts and untilts the head-support member of the rotary drum D in response to the control signal. Accordingly, the effective slant angle between the rotary drum D and the magnetic tape MT (that is, the effective slant angle between the heads and the magnetic tape MT) can be changed in response to the control signal outputted from the tilt control circuit 43. The tilt control circuit 43 responds to the operation mode signal.

The magnetic reproducing apparatus of FIG. 1 can operate in a mode corresponding to ⅓-speed slow-motion playback and also in a mode corresponding to standard playback (normal playback). The ⅓-speed slow-motion playback will be explained hereinafter. It is assumed that the magnetic tape MT stores information which has been recorded by a VHS-format VTR operating in a standard recording mode (a standard-speed recording mode or a normal-speed recording mode).

During the ⅓-speed slow-motion playback, the magnetic tape MT remains fed continuously in synchronism with rotation of the rotary drum D. In this case, the speed of the feed of the magnetic tape MT is equal to one-third of the standard speed (the normal speed). The speed of the feed of the magnetic tape MT is determined by the output signal of the capstan control circuit 7. In addition, the effective slant angle between the rotary drum D and the magnetic tape MT (that is, the effective slant angle between the heads and the magnetic tape MT) is controlled by the motor 41 so that the level of a reproduced signal will not substantially change during every 1-field time interval. Furthermore, the drum motor control circuit 6 adjusts the drum motor 22 so that the relative linear velocity between the magnetic tape MT and the video heads will be held constant.

Figure 2:
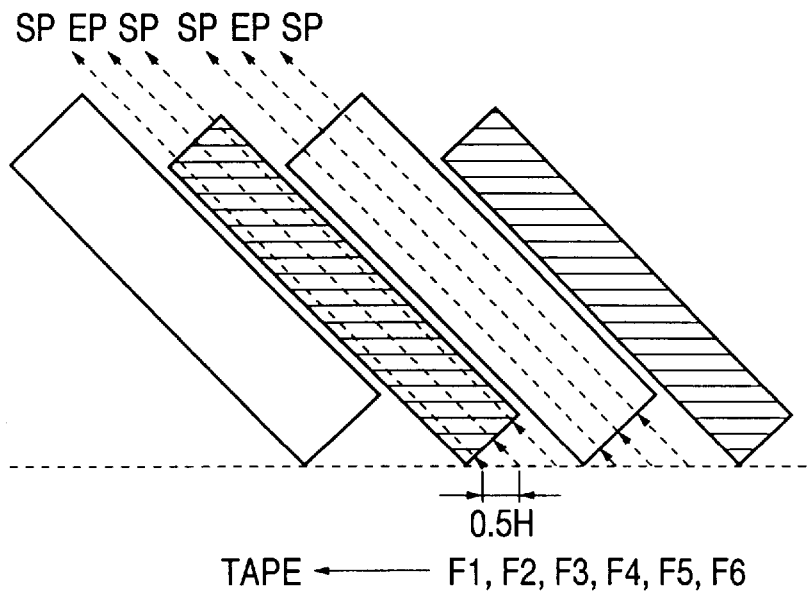
FIG. 2 is a diagram of the trajectories (the loci) of video heads which occur during ⅓-speed slow-motion playback implemented by the apparatus of FIG. 1.

During the ⅓-speed slow-motion playback, as shown in FIG. 2, the trajectories (the loci) of the SP heads with respect to tracks on the magnetic tape MT are offset from the centers of the tracks by values corresponding to one-third of the track pitch. Every track is traced three times by the SP head and the EP head which are opposed to each other. As shown in FIG. 2, six successive 1-field time intervals F1, F2, F3, F4, F5, and F6 compose one cycle during which two neighboring tracks are scanned.

Figure 3:
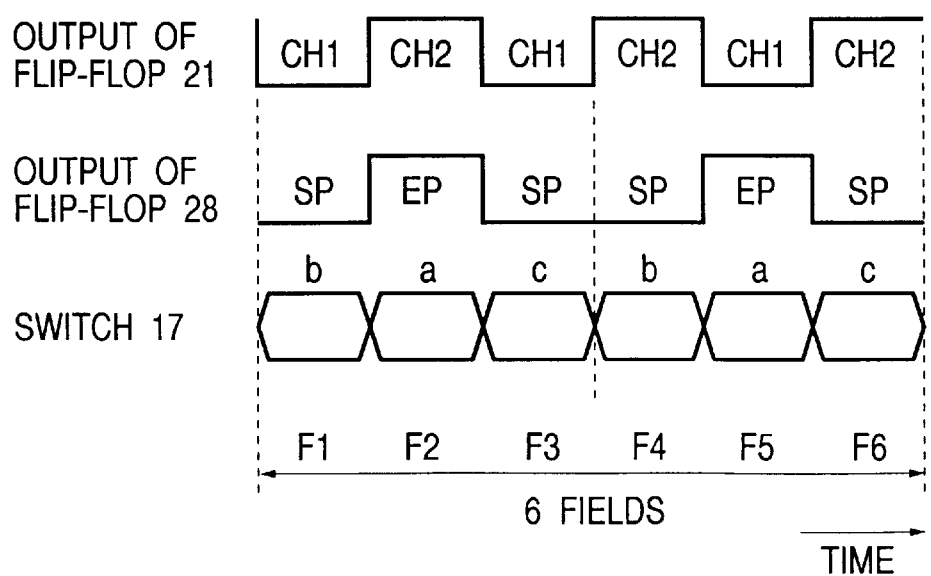
FIG. 3 is a time-domain diagram of the states of signals and a switch in the apparatus of FIG. 1.

As shown in FIG. 3, the output signal of the flip-flop circuit 21 is in a low-level state during the alternate 1-field time intervals F1, F3, and F5. The output signal of the flip-flop circuit 21 is in a high-level state during the alternate 1-field time intervals F2, F4, and F6. The switch 16 periodically and cyclically selects one of the output signals of the switches 14 and 15 in response to the output signal of the flip-flop circuit 21. Specifically, during the alternate 1-field time intervals F1, F3, and F5, the switch 16 selects the output signal of the switch 14 which corresponds to the channel CH1. During the alternate 1-field time intervals F2, F4, and F6, the switch 16 selects the output signal of the switch 15 which corresponds to the channel CH2.

As shown in FIG. 3, the output signal of the flip-flop circuit 28 is in a low-level state during the 1-field time intervals F1, F3, F4, and F6. The output signal of the flip-flop circuit 28 is in a high-level state during the 1-field time intervals F2 and F5. The switch 14 periodically and cyclically selects one of the output signals of the SP head (the main head SPH) and the EP head (the sub head EPH) for the channel CH1 in response to the output signal of the flip-flop circuit 28. Specifically, during the 1-field time intervals F1, F3, F4, and F6, the switch 14 selects the output signal of the SP head for the channel CH1. During the 1-field time intervals F2 and F5, the switch 14 selects the output signal of the EP head for the channel CH1. The switch 15 periodically and cyclically selects one of the output signals of the SP head (the main head SPH) and the EP head (the sub head EPH) for the channel CH2 in response to the output signal of the flip-flop circuit 28. Specifically, during the 1-field time intervals F1, F3, F4, and F6, the switch 15 selects the output signal of the SP head for the channel CH2. During the 1-field time intervals F2 and F5, the switch 15 selects the output signal of the EP head for the channel CH2.

Figure 4:
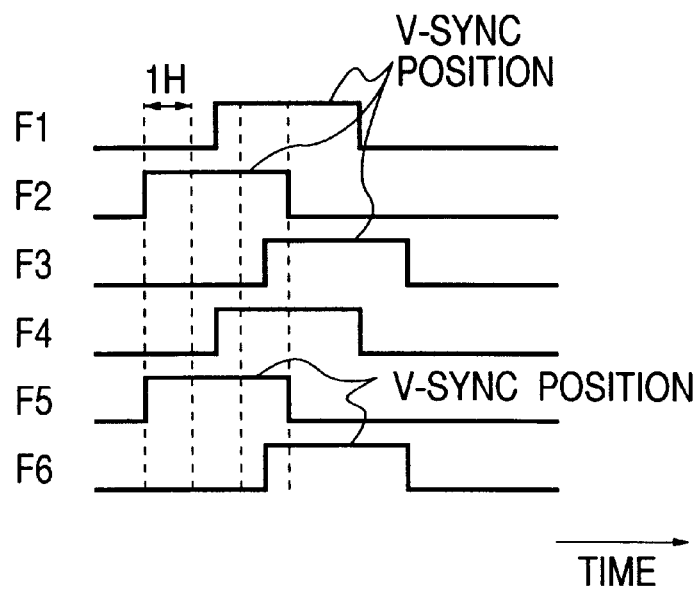
FIG. 4 is a time-domain diagram of the temporal positions of vertical sync signals reproduced during ⅓-speed slow-motion playback implemented by the apparatus of FIG. 1.

Since the positional difference between the SP head and the EP head, which are opposed to each other, corresponds to a 2H interval, a 2H shift of a reproduced video signal occurs upon every change between the SP head and the EP head. As previously explained, the trajectories (the loci) of the SP heads with respect to tracks on the magnetic tape MT are offset from the centers of the tracks by values corresponding to one-third of the track pitch. This offset causes a time-base shift of a 0.5H interval. Therefore, as shown in FIG. 4, during the 1-field time intervals F1 and F4, the temporal position of a vertical sync signal in a reproduced signal shifts or delays from the normal position by a 1.5H interval. Here, the normal position is defined by the output signal of the flip-flop circuit 21. As shown in FIG. 4, during the 1-field time intervals F2 and F5, the temporal position of a vertical sync signal in a reproduced signal coincides with the normal position. During the 1-field time intervals F3 and F6, the temporal position of a vertical sync signal in a reproduced signal shifts or delays from the normal position by a 2.5H interval.

Figure 5:
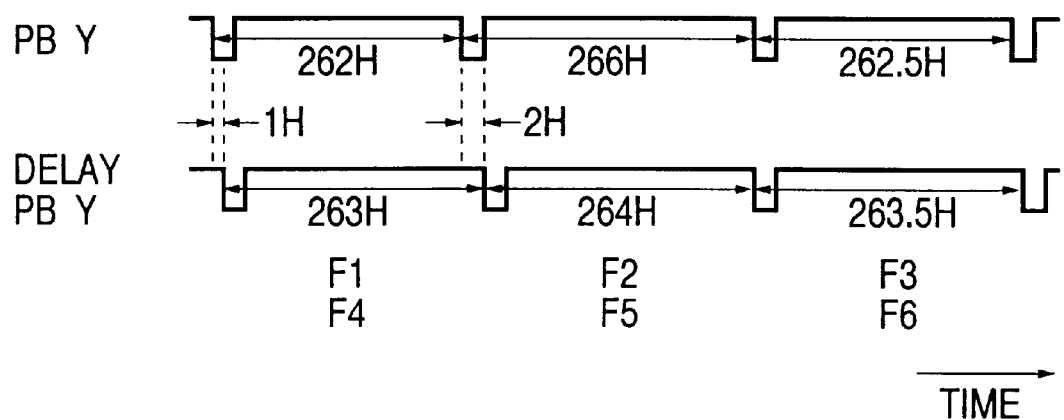
FIG. 5 is a time-domain diagram of an uncorrected vertical sync signal and a correction-resultant vertical sync signal in the apparatus of FIG. 1.

As shown in FIG. 5, the period of a vertical sync signal in a reproduced signal (PB Y) related to the 1-field time intervals F1 and F4 is equal to a 262H interval. The period of a vertical sync signal in a reproduced signal (PB Y) related to the 1-field time intervals F2 and F5 is equal to a 266H interval. The period of a vertical sync signal in a reproduced signal (PB Y) related to the 1-field time intervals F3 and F6 is equal to a 262.5H interval. These variations in the period of a vertical sync signal are corrected as will be explained later. It should be noted that such variations would cause a vertical shake or vibration of reproduced images if a suitable countermeasure is not taken.

During the ⅓-speed slow-motion playback, a reproduced signal which is outputted from the switch 16 travels to the luminance signal processing circuit 4 and the color signal processing circuit 5. The luminance signal processing circuit 4 demodulates the reproduced signal into a luminance signal (PB Y). The color signal processing circuit 5 demodulates the reproduced signal into a color signal (PB C).

The luminance signal is outputted from the luminance signal processing circuit 4 to the switch 17 and the delay circuit 8. The delay circuit 8 defers the output signal of the luminance signal processing circuit 4 by a time interval equal to a horizontal scanning period (a 1H interval). An output signal of the delay circuit 8 is applied to the switch 17 and the delay circuit 9. The delay circuit 9 defers the output signal of the delay circuit 8 by a time interval equal to a horizontal scanning period (a 1H interval). The output signal of the delay circuit 9 is applied to the switch 17.

The switch 17 periodically and cyclically selects one from among the output signals of the luminance signal processing circuit 4 and the delay circuits 8 and 9 in response to the output signals of the flip-flop circuits 29 and 30. As shown in FIG. 3, during the 1-field time intervals F1 and F4, the switch 17 selects the output signal of the delay circuit 8. During the 1-field time intervals F2 and F5, the switch 17 selects the output signal of the delay circuit 9. During the 1-field time intervals F3 and F6, the switch 17 selects the output signal of the luminance signal processing circuit 4.

Figure 6:
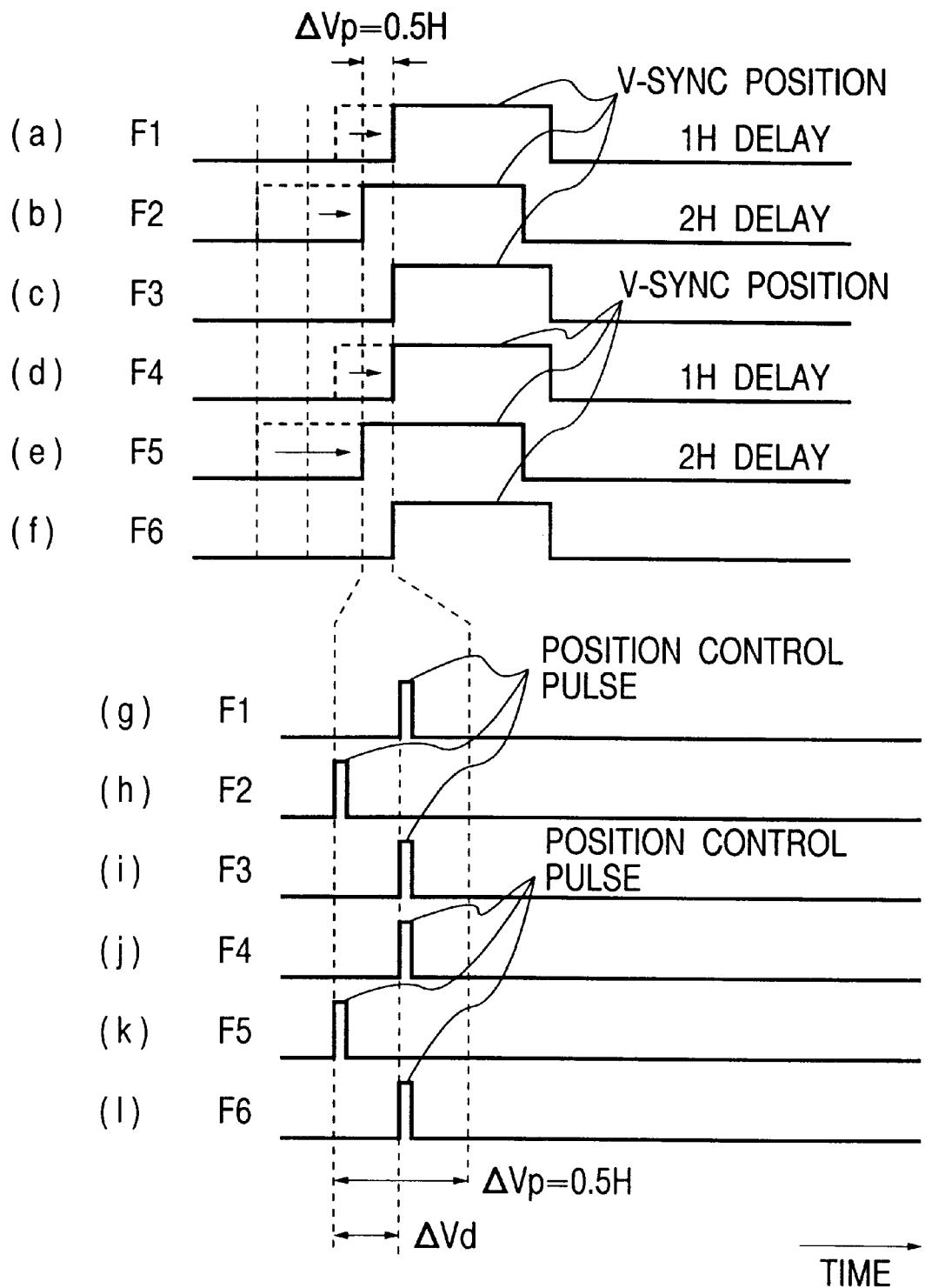
FIG. 6 is a time-domain diagram of the temporal positions of correction-resultant vertical sync signals, and position control pulses for a pseudo vertical sync signal in the apparatus of FIG. 1.

Therefore, as shown in FIG. 6, a vertical sync signal in a reproduced signal related to the 1-field time intervals F1 and F4 is delayed by a 1H interval. A vertical sync signal in a reproduced signal related to the 1-field time intervals F2 and F5 is delayed by a 2H interval. A vertical sync signal in a reproduced signal related to the 1-field time intervals F3 and F6 is not delayed. As a result, vertical sync signals related to the 1-field time intervals F1, F3, F4, and F6 have a first common timing while vertical sync signals related to the 1-field time intervals F2 and F5 have a second common timing. The second common timing precedes the first common timing by an interval $\Delta Vp$ equal to a 0.5H interval.

As shown in FIG. 5, regarding the 1-field time intervals F1 and F4, the period of a vertical sync signal in the output signal (the delayed signal PB Y) of the switch 17 is equal to a 263H interval. Regarding the 1-field time intervals F2 and F5, the period of a vertical sync signal in the output signal (the delayed signal PB Y) of the switch 17 is equal to a 264H interval. Regarding the 1-field time intervals F3 and F6, the period of a vertical sync signal in the output signal (the delayed signal PB Y) of the switch 17 is equal to a 263.5H interval.

During the ⅓-speed slow-motion playback, the switch 17 outputs the selected signal (the luminance signal) to the adding circuit 24. On the other hand, the color signal processing circuit 4 outputs the color signal to the adding circuit 24. The adding circuit 24 combines the luminance signal and the color signal into a first composite video signal. The adding circuit 24 outputs the first composite video signal to the switch 18. The switch 18 receives the pseudo vertical sync signal from the pseudo vertical sync signal generating circuit 2. The switch 18 replaces a vertical sync signal in the first composite video signal by the pseudo vertical sync signal, and thereby converts the first composite video signal into a second composite video signal. The switch 18 outputs the second composite video signal. The second composite video signal has vertical sync pulses which are temporally spaced at regular intervals.

Figure 7:
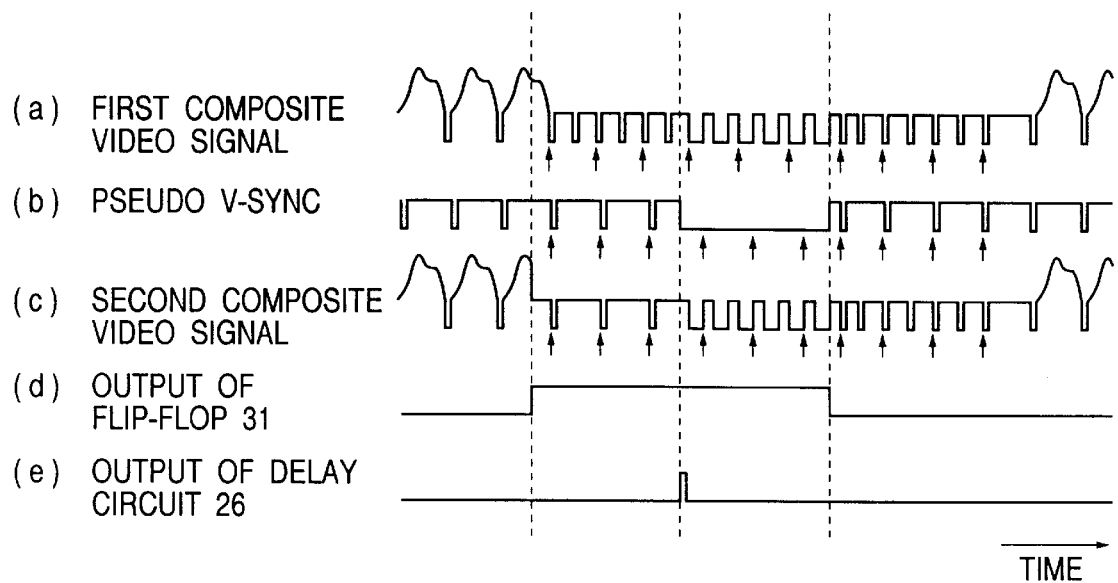
FIG. 7 is a time-domain diagram of various signals in the apparatus of FIG. 1.

The pseudo vertical sync signal generated by the pseudo vertical sync signal generating circuit 2 has a waveform such as shown in the portion (b) of FIG. 7. As shown in the portions (b) and (e) of FIG. 7, the pseudo vertical sync signal falls into a low-level state upon the occurrence of every rising edge in the output signal of the variable pulse delay circuit 26. The pseudo vertical sync signal remains in the low-level state for a 3H interval. Then, the pseudo vertical sync signal moves out of the low-level state.

During the ⅓-speed slow-motion playback, the monostable multivibrator 25 outputs a pulse synchronized with each of rising edges and falling edges in the output signal of the flip-flop circuit 21. The monostable multivibrator 25 feeds the resultant pulse signal to the variable pulse delay circuit 26. The variable pulse delay circuit 26 defers the output signal of the monostable multivibrator 25 by a time interval depending on the pulse position control signal.

The output signal of the flip-flop circuit 31 changes from a low-level state to a high-level state in response to every pulse in the output signal of the monostable multivibrator 25. The output signal of the flip-flop circuit 31 changes from the high-level state to the low-level state in response to every pulse in the output signal of the delay circuit 27. As shown in the portions (d) and (e) of FIG. 7, the output signal of the flip-flop circuit 31 remains in the high-level state during a time interval containing the moment of the occurrence of every rising edge in the output signal of the variable pulse delay circuit 26. As shown in the portions (b) and (d) of FIG. 7, every high-to-low change of the output signal of the flip-flop circuit 31 coincides with a corresponding low-to-high change of the pseudo vertical sync signal.

During the ⅓-speed slow-motion playback, the switch 18 selects one of the first composite video signal and the pseudo vertical sync signal in response to the output signal of the flip-flop circuit 31. Specifically, the switch 18 selects the pseudo vertical sync signal when the output signal of the flip-flop circuit 31 is in the high-level state. The switch 18 selects the first composite video signal when the output signal of the flip-flop circuit 31 is in the low-level state. Thereby, the switch 18 replaces the vertical sync signal in the first composite video signal by the pseudo vertical sync signal. Thus, the switch 18 converts the first composite video signal into the second composite video signal. When the first composite video signal and the pseudo vertical sync signal have waveforms such as shown in the portions (a) and (b) of FIG. 7, the second composite video signal has a waveform shown in the portion (c) of FIG. 7.

During the ⅓-speed slow-motion playback, the pulse position control signal fed to the variable pulse delay circuit 26 periodically changes between two different states to provide the following timing relation. As shown in FIG. 6, during the 1-field time intervals F2 and F5, the leading edges of related pulses (related position control pulses) in the output signal of the variable pulse delay circuit 26 are close in timing to the leading edges of pulses in corresponding vertical sync signals. During the 1-field time intervals F1, F3, F4, and F6, the leading edges of related pulses (related position control pulses) in the output signal of the variable pulse delay circuit 26 delay in timing from the leading edges of position control pulses available in the 1-field time intervals F2 and F5 by a time interval $\Delta Vd$. It is preferable to adjust the time interval $\Delta Vd$ in accordance with the characteristics of a display or a monitor for indicating images represented by the second composite video signal.

As previously indicated, the rotary drum D is provided with a mechanism for changing the effective slant angle with respect to the magnetic tape MT. This mechanism will be explained hereinafter.

Figure 22:
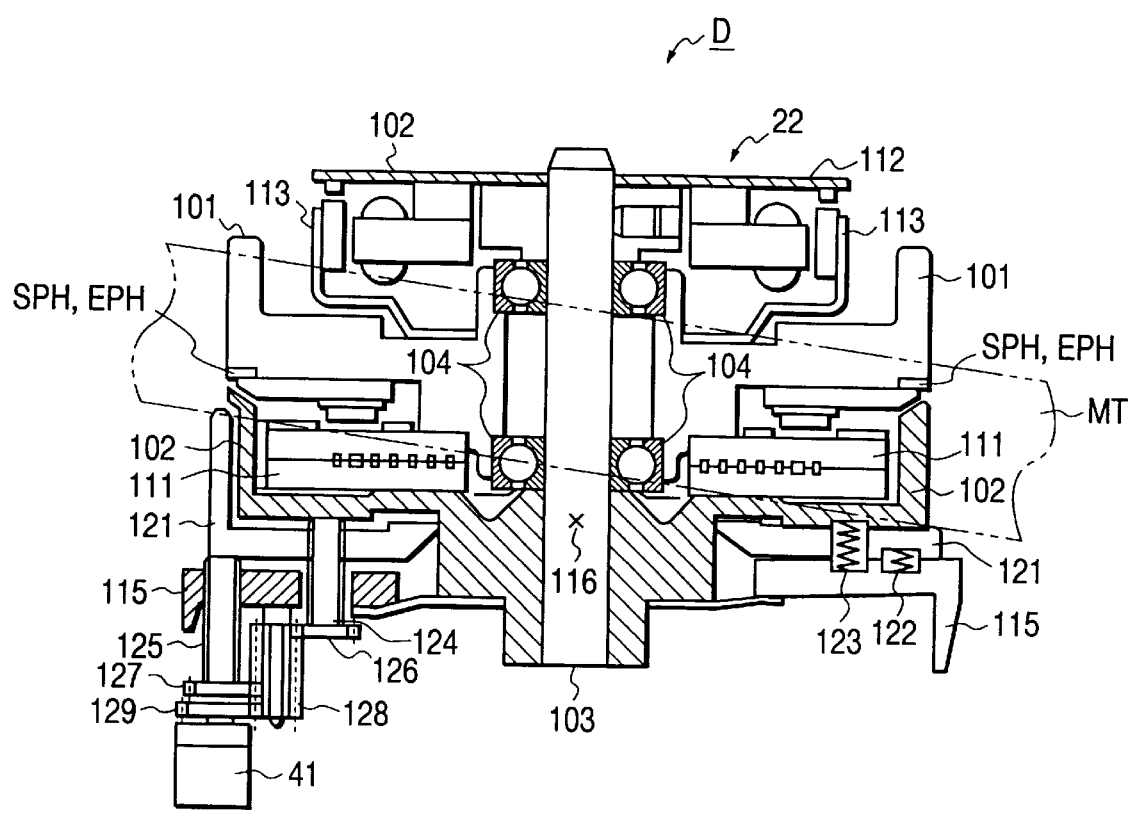
FIG. 22 is a sectional view of a rotary drum in the apparatus of FIG. 1.

With reference to FIG. 22, the rotary drum D includes an upper drum 101 and a lower drum 102. The upper drum 101 is rotatably mounted on a drum shaft 103 via a bearing 104. The upper drum 101 can rotate circumferentially about the drum shaft 103. The lower drum 102 is fixed to the drum shaft 103. The video heads SPH and EPH are mounted on the upper drum 101. A rotary transformer 111 is provided on the upper drum 101 and the lower drum 102. The magnetic tape MT is wound on the upper drum 101 and the lower drum 102 along a part of a helix.

The drum motor 22 includes a stator 112 and a rotor 113. The stator 112 is fixed to the drum shaft 103. The rotor 113 is fixed to the upper drum 101. Accordingly, the upper drum 101 rotates circumferentially together with the rotor 113 of the drum motor 22.

The lower drum 102 and the drum shaft 103 are movably supported on a fixed drum base 115. The lower drum 102 and the drum shaft 103 can rotate relative to the drum base 115 about an axis 116 perpendicular to the longitudinal axis of the drum shaft 103.

A lead ring 121 is provided between the lower drum 102 and the drum base 115. A spring 122 urges a right-hand side of the lead ring 121 relative to the drum base 115 in the upward direction as viewed in FIG. 22. A spring 123 urges a right-hand side of the lower drum 102 relative to the drum base 115 in the upward direction as viewed in FIG. 22.

A screw 124 meshing with threads in the lead ring 121 engages a left-hand side of the lower drum 102 to rotate the lower drum 102 relative to the lead ring 121. A screw 125 meshing with threads in the drum base 115 engages a left-hand side of the lead ring 121 to rotate the lead ring 121 relative to the drum base 115. The screws 124 and 125 are coupled with the motor 41 via gears 126, 127, 128, and 129.

As the motor 41 is operated, the screws 124 and 125 are driven so that the lower drum 102 is rotated. The rotation of the lower drum 102 causes the drum shaft 103 to rotate relative to the drum base 115 about the axis 116 perpendicular to the central axis of the drum shaft 103. The upper drum 101 moves in accordance with the rotation of the drum shaft 103. The slant angle of the upper drum 101 relative to the magnetic tape MT varies in accordance with the movement thereof. In this way, the upper drum 101 is tilted and untilted by the motor 41. Thus, the effective slant angle of the video heads SPH and EPH relative to the magnetic tape MT varies in accordance with the tilting and untilting movement of the upper drum 101.

Second Embodiment

A second embodiment of this invention is similar to the first embodiment thereof except for design changes indicated hereinafter. The second embodiment of this invention outputs a composite video signal suited for a Hi-Vision TV monitor (a Hi-Vision TV display) in which the processing of a vertical sync signal in a current 1-field time interval is executed in response to a vertical sync signal available during the immediately preceding 1-field time interval.

Figure 8:
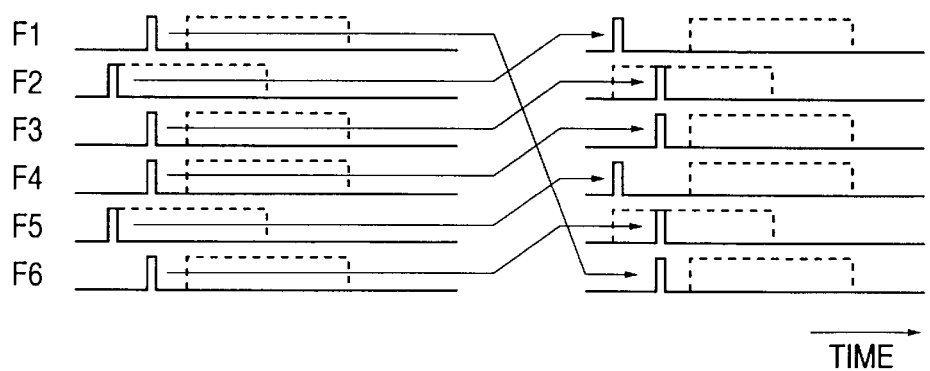
FIG. 8 is a diagram of the temporal positions of reproduced vertical sync signals, and position control pulses for a pseudo vertical sync signal in a magnetic reproducing apparatus according to a second embodiment of this invention.

With reference to FIG. 8, in the second embodiment of this invention, every pulse in the output signal of the variable pulse delay circuit 26 is temporally advanced by a 1-field time interval so that the pseudo vertical sync signal will replace a vertical sync signal in the first composite video signal which occurs during the immediately preceding 1-field time interval.

For a TV monitor (a TV display) in which the processing of a vertical sync signal in a current 1-field time interval is executed in response to a vertical sync signal available during a 1-field time interval preceding the current 1-field time interval by N fields, the second embodiment of this invention is modified to implement the following process. Every pulse in the output signal of the variable pulse delay circuit 26 is temporally advanced by N fields so that the pseudo vertical sync signal will replace a vertical sync signal in the first composite video signal which occurs during a 1-field time interval preceding the current 1-field time interval by N fields.

Third Embodiment

A third embodiment of this invention is similar to the first embodiment thereof except for design changes indicated hereinafter.

A magnetic reproducing apparatus according to the third embodiment of this invention can operate in a mode corresponding to ½-speed slow-motion playback and also in a mode corresponding to standard playback (normal playback). The ½-speed slow-motion playback will be explained hereinafter. It is assumed that the magnetic tape MT stores information which has been recorded by a VHS-format VTR operating in a standard recording mode (a standard-speed recording mode or a normal-speed recording mode).

During the ½-speed slow-motion playback, the magnetic tape MT remains fed continuously in synchronism with rotation of the rotary drum D. In this case, the speed of the feed of the magnetic tape MT is equal to a half of the standard speed (the normal speed). The speed of the feed of the magnetic tape MT is determined by the output signal of the capstan control circuit 7. In addition, the effective slant angle between the rotary drum D and the magnetic tape MT is controlled by the motor 41 so that the level of a reproduced signal will not substantially change during every 1-field time interval. Furthermore, the drum motor control circuit 6 adjusts the drum motor 22 so that the relative linear velocity between the magnetic tape MT and the video heads will be held constant.

Figure 9:
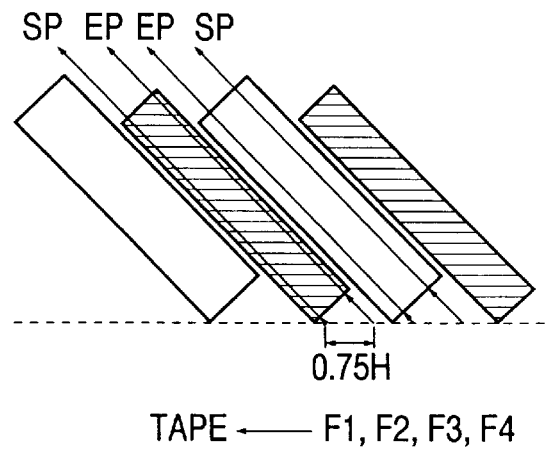
FIG. 9 is a diagram of the trajectories (the loci) of video heads which occur during ½-speed slow-motion playback implemented by a magnetic reproducing apparatus according to a third embodiment of this invention.

During the ½-speed slow-motion playback, as shown in FIG. 9, the trajectories (the loci) of the SP heads and the EP heads with respect to tracks on the magnetic tape MT are offset from the centers of the tracks by values corresponding to a half of the track pitch. Every track is traced twice by the SP head and the EP head which are opposed to each other. As shown in FIG. 9, four successive 1-field time intervals F1, F2, F3, and F4 compose one cycle during which two neighboring tracks are scanned.

Figure 10:
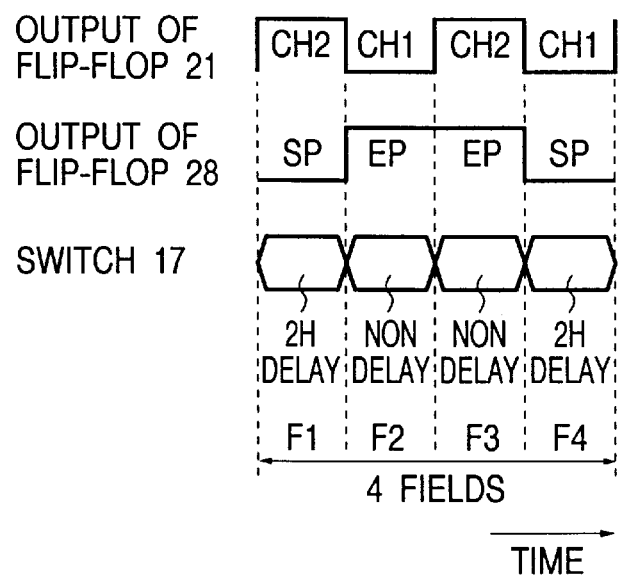
FIG. 10 is a time-domain diagram of the states of signals and a switch in the apparatus according to the third embodiment of this invention.

As shown in FIG. 10, the output signal of the flip-flop circuit 21 is in a high-level state during the alternate 1-field time intervals F1 and F3. The output signal of the flip-flop circuit 21 is in a low-level state during the alternate 1-field time intervals F2 and F4. The switch 16 periodically and cyclically selects one of the output signals of the switches 14 and 15 in response to the output signal of the flip-flop circuit 21. Specifically, during the alternate 1-field time intervals F1 and F3, the switch 16 selects the output signal of the switch 15 which corresponds to the channel CH2. During the alternate 1-field time intervals F2 and F4, the switch 16 selects the output signal of the switch 14 which corresponds to the channel CH1.

As shown in FIG. 10, the output signal of the flip-flop circuit 28 is in a low-level state during the 1-field time intervals F1 and F4. The output signal of the flip-flop circuit 28 is in a high-level state during the 1-field time intervals F2 and F3. The switch 14 periodically and cyclically selects one of the output signals of the SP head (the main head SPH) and the EP head (the sub head EPH) for the channel CH1 in response to the output signal of the flip-flop circuit 28. Specifically, during the 1-field time intervals F1 and F4, the switch 14 selects the output signal of the SP head for the channel CH1. During the 1-field time intervals F2 and F3, the switch 14 selects the output signal of the EP head for the channel CH1. The switch 15 periodically and cyclically selects one of the output signals of the SP head (the main head SPH) and the EP head (the sub head EPH) for the channel CH2 in response to the output signal of the flip-flop circuit 28. Specifically, during the 1-field time intervals F1 and F4, the switch 15 selects the output signal of the SP head for the channel CH2. During the 1-field time intervals F2 and F3, the switch 15 selects the output signal of the EP head for the channel CH2.

Figure 11:
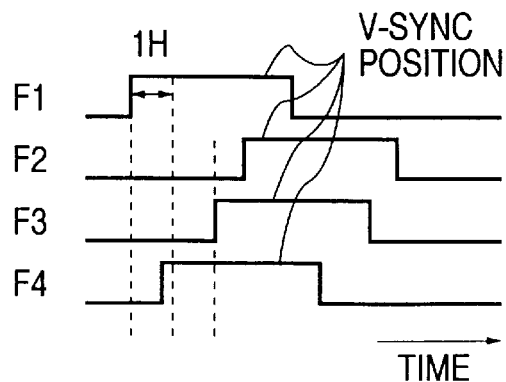
FIG. 11 is a time-domain diagram of the temporal positions of vertical sync signals reproduced during ½-speed slow-motion playback implemented by the apparatus according to the third embodiment of this invention.

Since the positional difference between the SP head and the EP head, which are opposed to each other, corresponds to a 2H interval, a 2H shift of a reproduced video signal occurs upon every change between the SP head and the EP head. As previously explained, the trajectories (the loci) of the SP heads and the EP heads with respect to tracks on the magnetic tape MT are offset from the centers of the tracks by values corresponding to a half of the track pitch. This offset causes a time-base shift of a 0.75H interval. Therefore, as shown in FIG. 11, during the 1-field time interval F1, the temporal position of a vertical sync signal in a reproduced signal coincides with the normal position. Here, the normal position is defined by the output signal of the flip-flop circuit 21. As shown in FIG. 11, during the 1-field time interval F2, the temporal position of a vertical sync signal in a reproduced signal shifts or delays from the normal position by a 2.75H interval. During the 1-field time interval F3, the temporal position of a vertical sync signal in a reproduced signal shifts or delays from the normal position by a 2H interval. During the 1-field time interval F4, the temporal position of a vertical sync signal in a reproduced signal shifts or delays from the normal position by a 0.75H interval.

Figure 12:
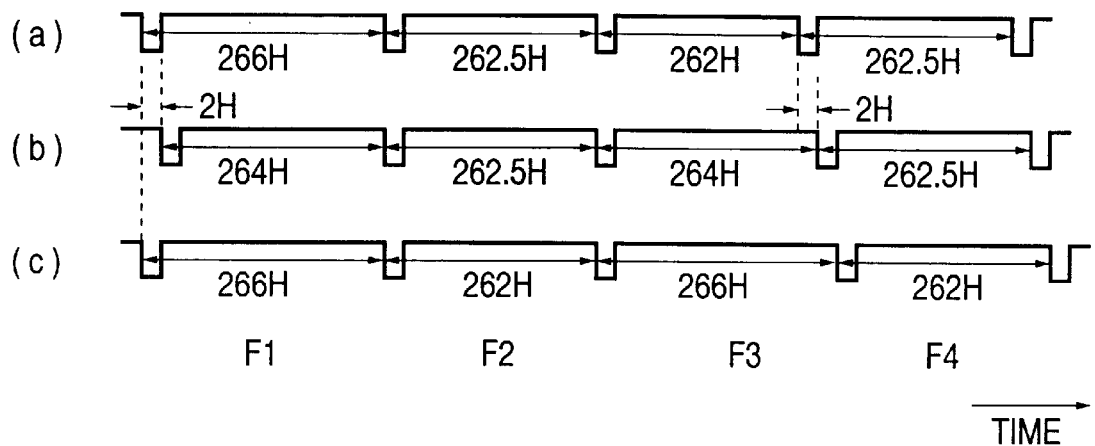
FIG. 12 is a time-domain diagram of an uncorrected vertical sync signal, a correction-resultant vertical sync signal, and another uncorrected vertical sync signal.

As shown in the portion (a) of FIG. 12, the period of a vertical sync signal in a reproduced signal related to the 1-field time interval F1 is equal to a 266H interval. The period of a vertical sync signal in a reproduced signal related to the 1-field time interval F2 is equal to a 262.5H interval. The period of a vertical sync signal in a reproduced signal related to the 1-field time interval F3 is equal to a 262H interval. The period of a vertical sync signal in a reproduced signal related to the 1-field time interval F4 is equal to a 262.5H interval. These variations in the period of a vertical sync signal are corrected as will be explained later. It should be noted that such variations would cause a vertical shake or vibration of reproduced images if a suitable countermeasure is not taken.

During the ½-speed slow-motion playback, a reproduced signal which is outputted from the switch 16 travels to the luminance signal processing circuit 4 and the color signal processing circuit 5. The luminance signal processing circuit 4 demodulates the reproduced signal into a luminance signal. The color signal processing circuit 5 demodulates the reproduced signal into a color signal.

The luminance signal is outputted from the luminance signal processing circuit 4 to the switch 17 and the delay circuit 8. The delay circuit 8 defers the output signal of the luminance signal processing circuit 4 by a time interval equal to a horizontal scanning period (a 1H interval). An output signal of the delay circuit 8 is applied to the switch 17 and the delay circuit 9. The delay circuit 9 defers the output signal of the delay circuit 8 by a time interval equal to a horizontal scanning period (a 1H interval). The output signal of the delay circuit 9 is applied to the switch 17.

The switch 17 periodically and cyclically selects one of the output signals of the luminance signal processing circuit 4 and the delay circuit 9 in response to the output signals of the flip-flop circuits 29 and 30. As shown in FIG. 10, during the 1-field time intervals F1 and F4, the switch 17 selects the output signal of the delay circuit 9. During the 1-field time intervals F2 and F3, the switch 17 selects the output signal of the luminance signal processing circuit 4.

Figure 13:
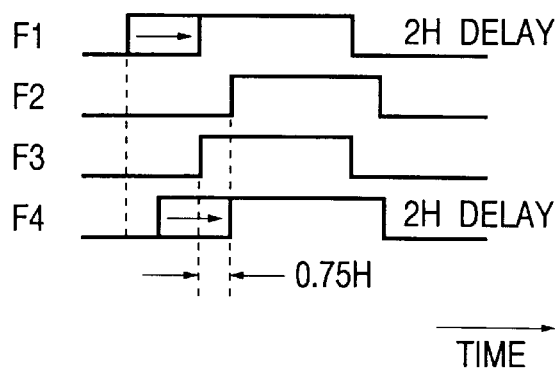
FIG. 13 is a time-domain diagram of conditions of delaying vertical sync signals reproduced during ½-speed slow-motion playback implemented by the apparatus according to the third embodiment of this invention.

Therefore, as shown in FIG. 13, a vertical sync signal in a reproduced signal related to the 1-field time intervals F1 and F4 is delayed by a 2H interval. A vertical sync signal in a reproduced signal related to the 1-field time intervals F2 and F3 is not delayed. As a result, vertical sync signals related to the 1-field time intervals F1 and F3 have a first common timing while vertical sync signals related to the 1-field time intervals F2 and F4 have a second common timing. The first common timing precedes the second common timing by a 0.75H interval.

As shown in the portion (b) of FIG. 12, regarding the 1-field time intervals F1 and F3, the period of a vertical sync signal in the output signal of the switch 17 is equal to a 264H interval. Regarding the 1-field time intervals F2 and F4, the period of a vertical sync signal in the output signal of the switch 17 is equal to a 262.5H interval.

During the ½-speed slow-motion playback, the switch 17 outputs the selected signal (the luminance signal) to the adding circuit 24. On the other hand, the color signal processing circuit 5 outputs the color signal to the adding circuit 24. The adding circuit 24 combines the luminance signal and the color signal into a first composite video signal. The adding circuit 24 outputs the first composite video signal to the switch 18. The switch 18 receives the pseudo vertical sync signal from the pseudo vertical sync signal generating circuit 2. The switch 18 replaces a vertical sync signal in the first composite video signal by the pseudo vertical sync signal, and thereby converts the first composite video signal into a second composite video signal. The switch 18 outputs the second composite video signal. The second composite video signal has vertical sync pulses which are temporally spaced at regular intervals.

The pseudo vertical sync signal falls into a low-level state upon the occurrence of every rising edge in the output signal of the variable pulse delay circuit 26. The pseudo vertical sync signal remains in the low-level state for a 3H interval. Then, the pseudo vertical sync signal moves out of the low-level state.

During the ½-speed slow-motion playback, the monostable multivibrator 25 outputs a pulse synchronized with each of rising edges and falling edges in the output signal of the flip-flop circuit 21. The monostable multivibrator 25 feeds the resultant pulse signal to the variable pulse delay circuit 26. The variable pulse delay circuit 26 defers the output signal of the monostable multivibrator 25 by a time interval depending on the pulse position control signal.

The output signal of the flip-flop circuit 31 changes from a low-level state to a high-level state in response to every pulse in the output signal of the monostable multivibrator 25. The output signal of the flip-flop circuit 31 changes from the high-level state to the low-level state in response to every pulse in the output signal of the delay circuit 27.

During the ½-speed slow-motion playback, the switch 18 selects one of the first composite video signal and the pseudo vertical sync signal in response to the output signal of the flip-flop circuit 31. Thereby, the switch 18 replaces the vertical sync signal in the first composite video signal by the pseudo vertical sync signal. Thus, the switch 18 converts the first composite video signal into the second composite video signal.

During the ½-speed slow-motion playback, the pulse position control signal fed to the variable pulse delay circuit 26 periodically changes between two different states to provide the following timing relation. During the 1-field time intervals F1 and F3, the leading edges of related pulses (related position control pulses) in the output signal of the variable pulse delay circuit 26 are close in timing to the leading edges of pulses in corresponding vertical sync signals. During the 1-field time intervals F2 and F4, the leading edges of related pulses (related position control pulses) in the output signal of the variable pulse delay circuit 26 delay in timing from the leading edges of position control pulses available in the 1-field time intervals F1 and F3 by a time interval ΔVd. It is preferable to adjust the time interval ΔVd in accordance with the characteristics of a display or a monitor for indicating images represented by the second composite video signal.

Fourth Embodiment

A fourth embodiment of this invention is similar to the first embodiment thereof except for design changes indicated hereinafter.

A magnetic reproducing apparatus according to the fourth embodiment of this invention can operate in a mode corresponding to playback at a speed equal to a non-integer times the standard speed (the normal speed). This playback is referred to as the non-integer-speed playback. The non-integer is equal to, for example, 1/2, 1/3, 3/2, or 4/3. The magnetic reproducing apparatus according to the fourth embodiment of this invention can operate also in a mode corresponding to still-image playback.

Figure 14:
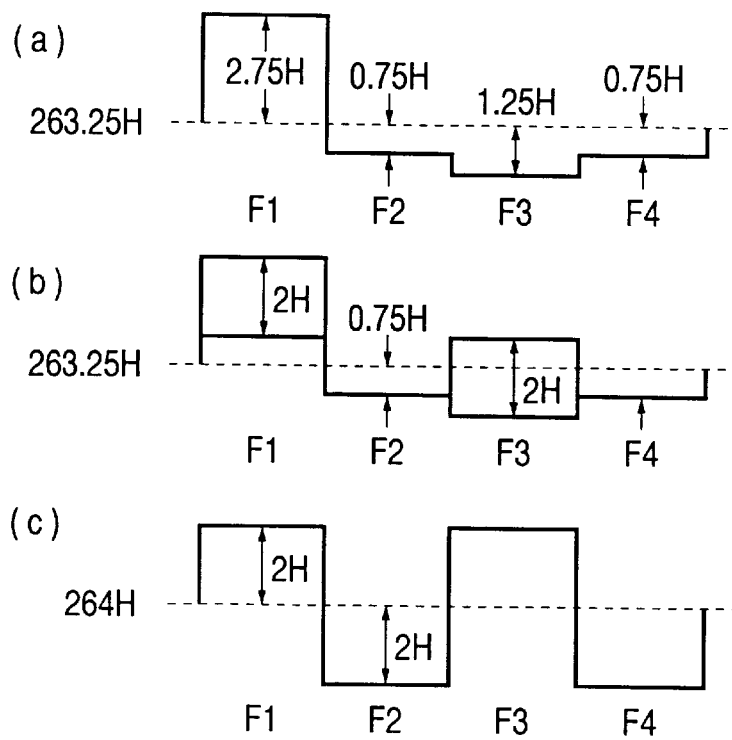
FIG. 14 is a diagram of deviations of the periods of vertical sync signals from mean periods.

Regarding a reproduced signal generated during non-integer-speed playback, the temporal position and the period of an uncorrected vertical sync signal vary from field to field as shown in the portion (a) of FIG. 12 and the portion (a) of FIG. 14.

Figure 15:
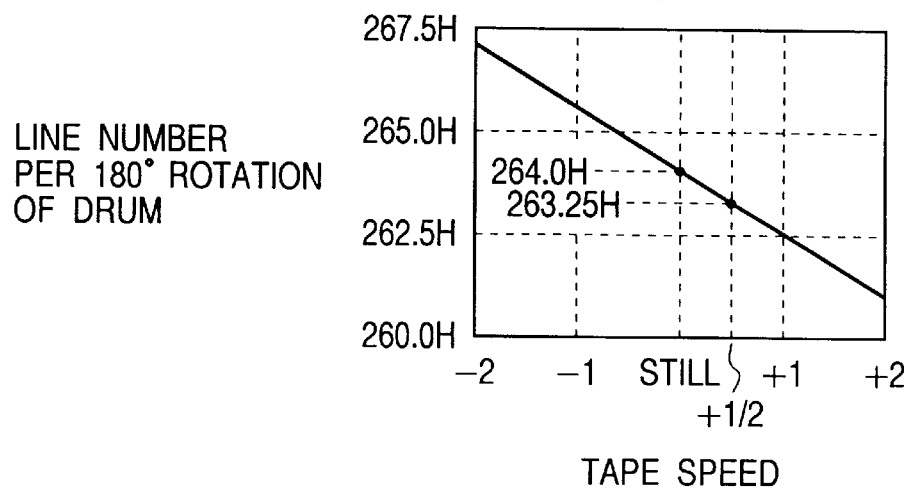
FIG. 15 is a diagram of the relation between the tape speed (the playback speed) and the number of horizontal sync pulses reproduced per 180° rotation of a rotary drum.

The correction implemented by the combination of the switch 17 and the delay circuits 8 and 9 provides only two different timings (two different temporal positions) of vertical sync signals with respect to the output signal of the flip-flop circuit 21 as shown in the portion (b) of FIG. 12 and the portion (b) of FIG. 14. The periods of correction-resultant vertical sync signals are symmetrical with respect to a mean period (corresponding to the number of horizontal sync pulses reproduced per 180° rotation of the rotary drum D) at a playback speed which is shown in FIG. 15.

The timings (the temporal positions) and the periods of the correction-resultant vertical sync signals are substantially equivalent to those of vertical sync signals reproduced during still-image playback which are shown in the portion (c) of FIG. 12 and the portion (c) of FIG. 14. Accordingly, a vertical shake or vibration of reproduced images generated during non-integer-speed playback can be corrected in a way similar to a corrective way using a pseudo vertical sync signal and being implemented during still-image playback.

Figure 16:
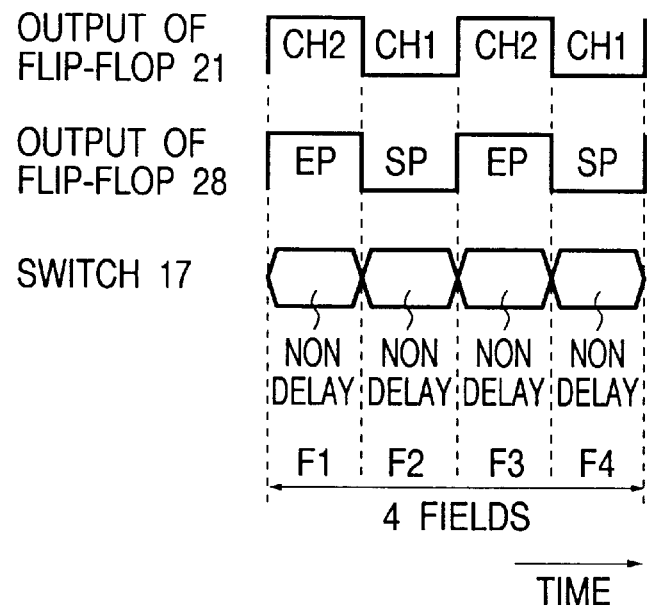
FIG. 16 is a time-domain diagram of the states of signals and a switch which occur during still-image playback implemented by a magnetic reproducing apparatus according to a fourth embodiment of this invention.

The still-image playback will be further explained. As shown in FIG. 16, the output signal of the flip-flop circuit 21 is in a high-level state during the alternate 1-field time intervals F1 and F3. The output signal of the flip-flop circuit 21 is in a low-level state during the alternate 1-field time intervals F2 and F4. The switch 16 periodically and cyclically selects one of the output signals of the switches 14 and 15 in response to the output signal of the flip-flop circuit 21. Specifically, during the alternate 1-field time intervals F1 and F3, the switch 16 selects the output signal of the switch 15 which corresponds to the channel CH2. During the alternate 1-field time intervals F2 and F4, the switch 16 selects the output signal of the switch 14 which corresponds to the channel CH1.

As shown in FIG. 16, the output signal of the flip-flop circuit 28 is in a high-level state during the 1-field time intervals F1 and F3. The output signal of the flip-flop circuit 28 is in a low-level state during the 1-field time intervals F2 and F4. The switch 14 periodically and cyclically selects one of the output signals of the SP head (the main head SPH) and the EP head (the sub head EPH) for the channel CH1 in response to the output signal of the flip-flop circuit 28. Specifically, during the 1-field time intervals F1 and F3, the switch 14 selects the output signal of the EP head for the channel CH1. During the 1-field time intervals F2 and F4, the switch 14 selects the output signal of the SP head for the channel CH1. The switch 15 periodically and cyclically selects one of the output signals of the SP head (the main head SPH) and the EP head (the sub head EPH) for the channel CH2 in response to the output signal of the flip-flop circuit 28. Specifically, during the 1-field time intervals F1 and F3, the switch 15 selects the output signal of the EP head for the channel CH2. During the 1-field time intervals F2 and F4, the switch 15 selects the output signal of the SP head for the channel CH2.

Figure 17:
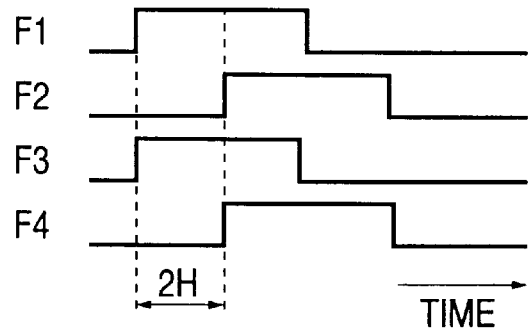
FIG. 17 is a time-domain diagram of the temporal positions of vertical sync signals reproduced during still-image playback implemented by the apparatus according to the fourth embodiment of this invention.

As shown in FIG. 17, vertical sync signals related to the 1-field time intervals F1 and F3 have a first common timing while vertical sync signals related to the 1-field time intervals F2 and F4 have a second common timing. The first common timing precedes the first common timing by a 2H interval.

The timing difference between vertical sync signals is denoted by "T". It should be noted that such a timing difference would cause a vertical shake or vibration of reproduced images if a suitable countermeasure is not taken. A desired timing difference in the pseudo vertical sync signal to correct the vertical image shake is denoted by "t". When the timing difference T is in a range sufficiently smaller than a mean period, the timing differences T and "t" have a proportional relation with each other.

Figure 18:
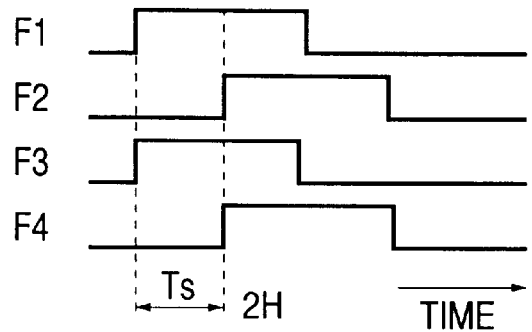
FIG. 18 is a time-domain diagram of the temporal positions of vertical sync signals reproduced during still-image playback implemented by the apparatus according to the fourth embodiment of this invention.
Figure 19:
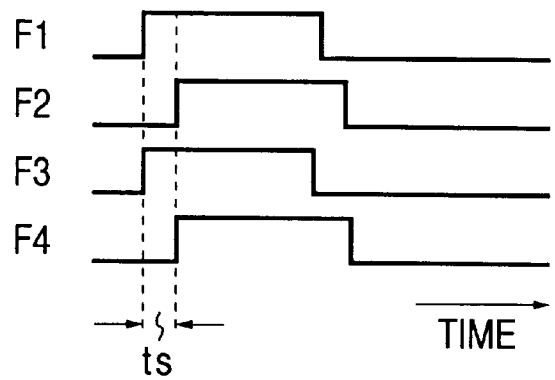
FIG. 19 is a time-domain diagram of a desired timing difference in a pseudo vertical sync signal which is determined in accordance with timing differences among vertical sync signals reproduced during still-image playback implemented by the apparatus according to the fourth embodiment of this invention.
Figure 20:
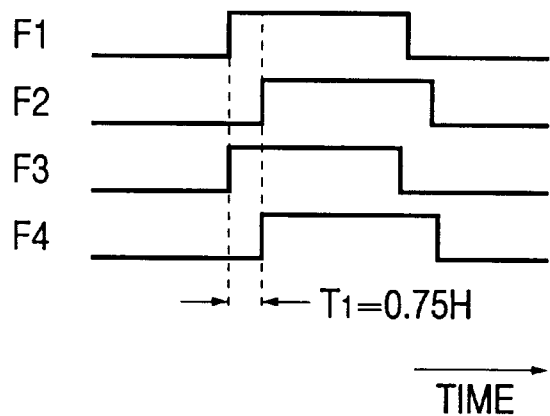
FIG. 20 is a time-domain diagram of the temporal positions of correction-resultant vertical sync signals which occur during playback at a speed equal to a non-integer times the standard speed (the normal speed).
Figure 21:
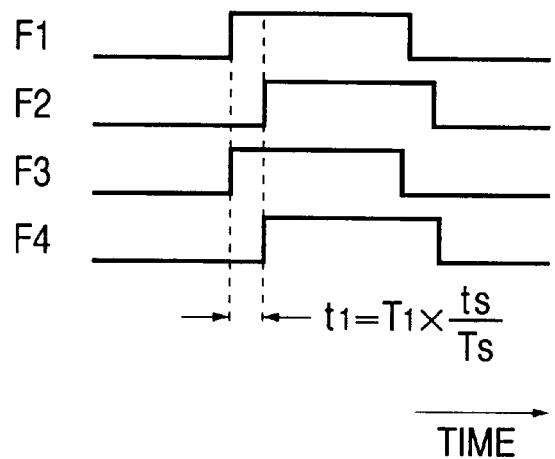
FIG. 21 is a time-domain diagram of a desired timing difference in a pseudo vertical sync signal which is determined in accordance with timing differences among correction-resultant vertical sync signals which occur during playback at a speed equal to a non-integer times the standard speed (the normal speed).

As shown in FIG. 18, the character "Ts" indicates the 2H timing difference between vertical sync signals reproduced during the still-image playback. As shown in FIG. 19, the character "ts" denotes a desired timing difference in the pseudo vertical sync signal to correct the vertical image shake caused by the timing difference Ts. As shown in FIG. 20, the character "T1" indicates the 0.75H timing difference between vertical sync signals reproduced during non-integer-speed playback. As shown in FIG. 21, the character "t1" denotes a desired timing difference in the pseudo vertical sync signal to correct the vertical image shake caused by the timing difference T1. In this case, the timing differences "t1", T1, "ts", and Ts have the following relation.

$$t1/T1 = ts/Ts$$

Accordingly, the desired timing difference "t1" in the pseudo vertical sync signal to correct the vertical image shake is given as follows.

$$t1 = T1 \cdot ts/Ts$$

where the timing differences Ts and "ts" are predetermined by calculation, and the timing difference "ts" is predetermined through adjustment implemented during still-image playback.

Thus, provided that the adjustment is previously implemented once during still-image playback, images without any vertical shake can be reproduced during later non-integer-speed playback.

In the case where the combination of the switch 17 and the delay circuits 8 and 9 executes correction to minimize the timing differences between reproduced vertical sync signals, the following process can be implemented. When it is possible to know a timing difference between vertical sync signals to minimize a vertical shake of images reproduced during specified non-integer-speed playback, calculation can be given of a desired timing difference in the pseudo vertical sync signal to minimize a vertical shake of images reproduced during other non-integer-speed playback.

During specified non-integer-speed playback, the combination of the switch 17 and the delay circuits 8 and 9 executes correction to provide a minimal timing difference T1 between reproduced vertical sync signals as shown in FIG. 20. The timing difference T1 is equal to, for example, a 0.75H interval. The pseudo vertical sync signal is interposed in the output signal of the switch 17 to minimize a vertical shake of reproduced images. The timing difference in the pseudo vertical sync signal is now denoted by "t1". The timing difference between vertical sync signals reproduced during other non-integer-speed playback is denoted by "Tn". A desired timing difference "tn" in the pseudo vertical sync signal to minimize a vertical shake of images reproduced during the other non-integer-speed playback is given as follows.

$$tn = Tn \cdot t1/T1.$$

By referring to this equation, the desired timing difference "tn" in the pseudo vertical sync signal can be calculated.

What is claimed is:

1. A magnetic reproducing apparatus of a helical scan type, comprising:

a rotary drum on which a magnetic tape is wound along a part of a helix;

a first set of a main head and a sub head mounted on the rotary drum, the main head and the sub head in the first set being positionally close to each other, the main head and the sub head in the first set having a first azimuth angle and a second azimuth angle respectively;

a second set of a main head and a sub head mounted on the rotary drum, the main head and the sub head in the second set being positionally close to each other, the main head and the sub head in the second set having the second azimuth angle and the first azimuth angle respectively, the second set being opposed to the first set;

means for continuously feeding the magnetic tape and sequentially selecting one from among output signals of the main head and the sub head in the first set and output signals of the main head and the sub head in the second set at a period corresponding to a field to generate a first reproduced signal and to implement a special playback process different from a standard playback process;

means for periodically and selectively delaying and undelaying the first reproduced signal to minimize differences among timing positions of vertical sync signals in the first reproduced signal, and thereby converting the first reproduced signal to a second reproduced signal;

means for generating pseudo vertical sync signals; and means for replacing vertical sync signals in the second reproduced signal by the pseudo vertical sync signals.

2. A magnetic reproducing apparatus as recited in claim 1, wherein the main heads in the first and second sets comprise heads for the standard playback process, and the sub heads in the first and second sets comprise heads for an extended playback process which relates to a track pitch equal to one-third of a track pitch in the standard playback process.

3. A magnetic reproducing apparatus as recited in claim 1, wherein the replacing means comprises means for advancing the pseudo vertical sync signals by at least one 1-field time interval, and means for replacing the vertical sync signals in the second reproduced signal by the advancing-resultant pseudo vertical sync signals.

4. A magnetic reproducing apparatus as recited in claim 1, wherein the delaying/undelaying means comprises means for periodically and selectively delaying and undelaying luminance components of the first reproduced signal, and means for continuing to undelay color components of the first reproduced signal.

5. A magnetic reproducing apparatus as recited in claim 1, further comprising means for varying a slant angle of the main heads and the sub heads in the first and second sets with respect to the magnetic tape, and means for, during the special playback process, controlling the varying means to hold a level of the first reproduced signal substantially constant for every 1-field time interval.

6. A magnetic reproducing apparatus of a helical scan type, comprising:

a rotary drum on which a magnetic tape is wound along a part of a helix;

a first set of a main head and a sub head mounted on the rotary drum, the main head and the sub head in the first set being positionally close to each other, the main head and the sub head in the first set having a first azimuth angle and a second azimuth angle respectively;

a second set of a main head and a sub head mounted on the rotary drum, the main head and the sub head in the second set being positionally close to each other, the main head and the sub head in the second set having the second azimuth angle and the first azimuth angle respectively, the second set being opposed to the first set;

means for continuously feeding the magnetic tape and sequentially selecting one from among output signals of the main head and the sub head in the first set and output signals of the main head and the sub head in the second set at a period corresponding to a field to generate a first reproduced signal and to implement a special playback process having a playback speed equal to a non-integer times a standard playback speed;

means for periodically and selectively delaying and undelaying the first reproduced signal to minimize differences among timing positions of vertical sync signals in the first reproduced signal, and thereby converting the first reproduced signal to a second reproduced signal;

means for generating pseudo vertical sync signals;

means for periodically replacing the second reproduced signal by the pseudo vertical sync signals at replacement timing positions; and means for deciding the replacement timing positions on the basis of a reference replacement timing position at which a vertical shake of images, reproduced at a playback speed selected from among playback speeds including a still-image playback speed, is minimized.

* * * * *